United States Patent [19]

Millsapps, Jr.

[11] 3,942,596
[45] Mar. 9, 1976

[54] LUBRICANT PRESSURE RELIEF VALVE FOR EARTH PENETRATING TOOLS

[75] Inventor: Stuart C. Millsapps, Jr., Houston, Tex.

[73] Assignee: Hughes Tool Company, Houston, Tex.

[22] Filed: May 3, 1974

[21] Appl. No.: 466,641

[52] U.S. Cl. ............... 175/227; 137/512.3; 184/14; 184/45 R
[51] Int. Cl.² .................. F16K 17/02; F16N 23/00
[58] Field of Search ............. 175/228, 227; 277/83; 308/187, 8.2; 137/516.15, 223, 512, 512.3, 454.2, 454.6, 525; 184/14, 76, 72, 79, 74, 75, 35, 32, 34, 39, 41, 42, 45 R, 45 A, 52, 66, 80, 82, 26, 7 F; 173/73, 71

[56] References Cited
UNITED STATES PATENTS

| | | | |
|---|---|---|---|
| 1,865,231 | 6/1932 | Buck | 137/223 |
| 2,088,788 | 8/1937 | Hage | 137/525 X |
| 2,306,012 | 12/1942 | Campbell | 137/512 |
| 2,630,326 | 3/1953 | Bryant | 137/525 X |
| 3,298,394 | 1/1967 | Chorkey | 137/516.15 X |
| 3,363,644 | 1/1968 | Malec | 137/516.15 |
| 3,384,113 | 5/1968 | Pennisi | 137/525 |
| 3,459,217 | 8/1969 | Callahan | 137/516.15 |
| 3,476,195 | 11/1969 | Galle | 175/228 |
| 3,511,271 | 5/1970 | Pollinger et al. | 137/512.3 |

FOREIGN PATENTS OR APPLICATIONS

| | | | |
|---|---|---|---|
| 541,231 | 5/1957 | Canada | 137/516.15 |

*Primary Examiner*—Richard C. Pinkham
*Assistant Examiner*—Arnold W. Kramer
*Attorney, Agent, or Firm*—Robert A. Felsman

[57] ABSTRACT

Disclosed herein for use with earth penetrating tools is an improved lubricant pressure relief system that utilizes a housing adapted for retention within a lubricant containing passage. An interior surface or opening of the housing is exposed to the lubricant in the passage and includes an outlet port which has an elastic pressure responsive valve covering the opening. The valve releases lubricant when a selected pressure is exceeded while excluding the entrance of exterior matter. The valve functions as a secondary pressure relief valve when used in combination with a spring biased pressure relief valve located within the opening of the housing, which is thereby protected from exterior matter and its successful operation assured.

4 Claims, 6 Drawing Figures

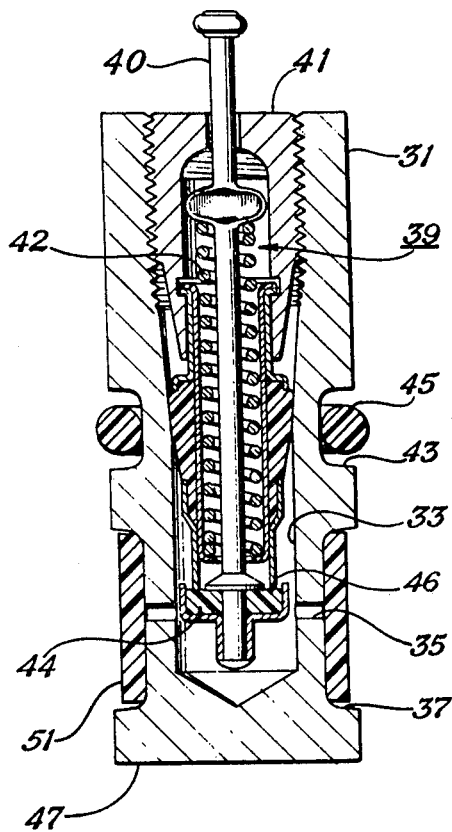
Fig. 2
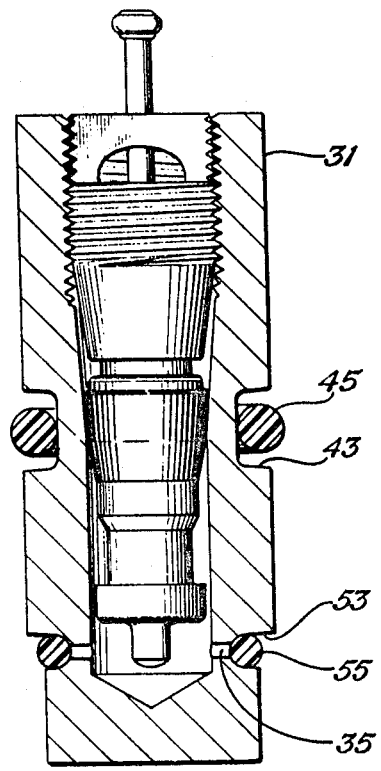
Fig. 4
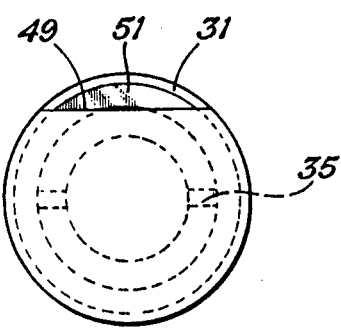
Fig. 3
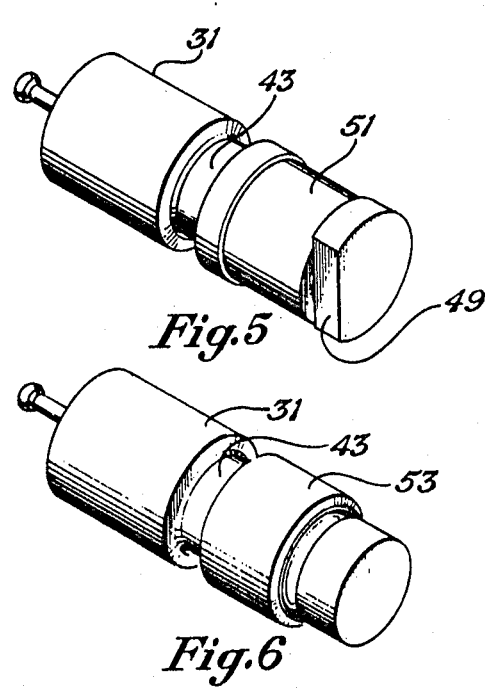
Fig. 5
Fig. 6 ial 3,942,596

IMPROVED LUBRICANT PRESSURE RELIEF VALVE FOR EARTH PENETRATING TOOLS

BACKGROUND OF THE INVENTION

1. Field of the Invention

This invention relates in general to improvements in the lubrication systems of earth penetrating tools.

2. Description of the Prior Art

Earth penetrating tools, including the rotatable cutter type earth boring drill bit, commonly utilize bearing lubrication systems. The successful lubrication of drill bit bearings was made practicable with the development of a seal capable of operating in the detrimental environment and conditions associated with earth boring. One of the most commercially successful seals is described in the U.S. Pat. to Atkinson, et al., No. 3,075,781. Improvements to such seals are disclosed in the U.S. Pats. to Cunningham, et al.. Nos. 3,137,508 and 3,119,878; and to Farr, et al., No. 3,313,552. The O-ring type seal has been successfully used in earth boring drill bits as described by Galle in U.S. Pat. No. 3,397,928.

A successful lubrication system for an earth boring drill bit generally includes in addition to a successful seal a compensator system that limits the pressure differential across the seal. One such compensator may be seen for example in the U.S. Pat. to Eenick, No. 3,007,751, and others in the U.S. Pats. to Cunningham, Nos. 3,007,750 and 3,137,508.

In addition to a successful compensator system, it is advantageous to include a pressure relief valve to relieve the lubrication system from excessive pressures caused by thermally induced expansion, or by the creation of gaseous hydrocarbons or other phenomenon. A successful pressure relief valve is disclosed in the U.S. Pat. to Galle, No. 3,476,195. While the pressure relief valve in this patent operates successfully in most instances, it has the disadvantages that foreign matter sometimes enters the valve region and by jamming its components prevents successful operation.

SUMMARY OF THE INVENTION

It is therefore the general object of this invention to provide improvements to the pressure release systems of earth penetrating tools to assure their successful operation. This object is accomplished in general with the provision of a protective means that includes a housing adapted for insertion and retention within the tool and having an outlet port covered by a pressure responsive valve or sleeve that releases lubricant when its pressure exceeds a selected valve while excluding the entrance of exterior matter. While such a protective means can operate as the primary pressure relief system, it is also advantageously used as a secondary pressure relief means which encloses a prior art, primary pressure relief means of the type referred to above. In its preferred embodiment the housing is generally cylindrical, with an axially extending opening exposed to the lubricant, and at least one port extending through its wall. An annular groove is formed circumferentially in the housing and is exposed to the exterior of the tool. Disposed within the annular groove is an elastic sleeve to cover the port to release the lubricant and exclude the entrance of exterior matter. Additional objects, features and advantages of the invention will become apparent in view of the following description.

BRIEF DESCRIPTION OF THE DRAWINGS

FIG. 2 is a side elevation view, partially in longitudinal section, of a housing which in this case forms a secondary relief valve or protective means that protects a prior art, primary pressure relief valve.

FIG. 3 is an end view of an unsectioned secondary relief valve of FIG. 2.

FIG. 4 is a side elevation view, partially in longitudinal section, of an alternate form of the invention.

FIG. 5 is a perspective view of the apparatus shown in FIG. 2.

FIG. 6 is a perspective view of the apparatus shown in FIG. 4.

DESCRIPTION OF THE PREFERRED EMBODIMENTS

Figure 1:
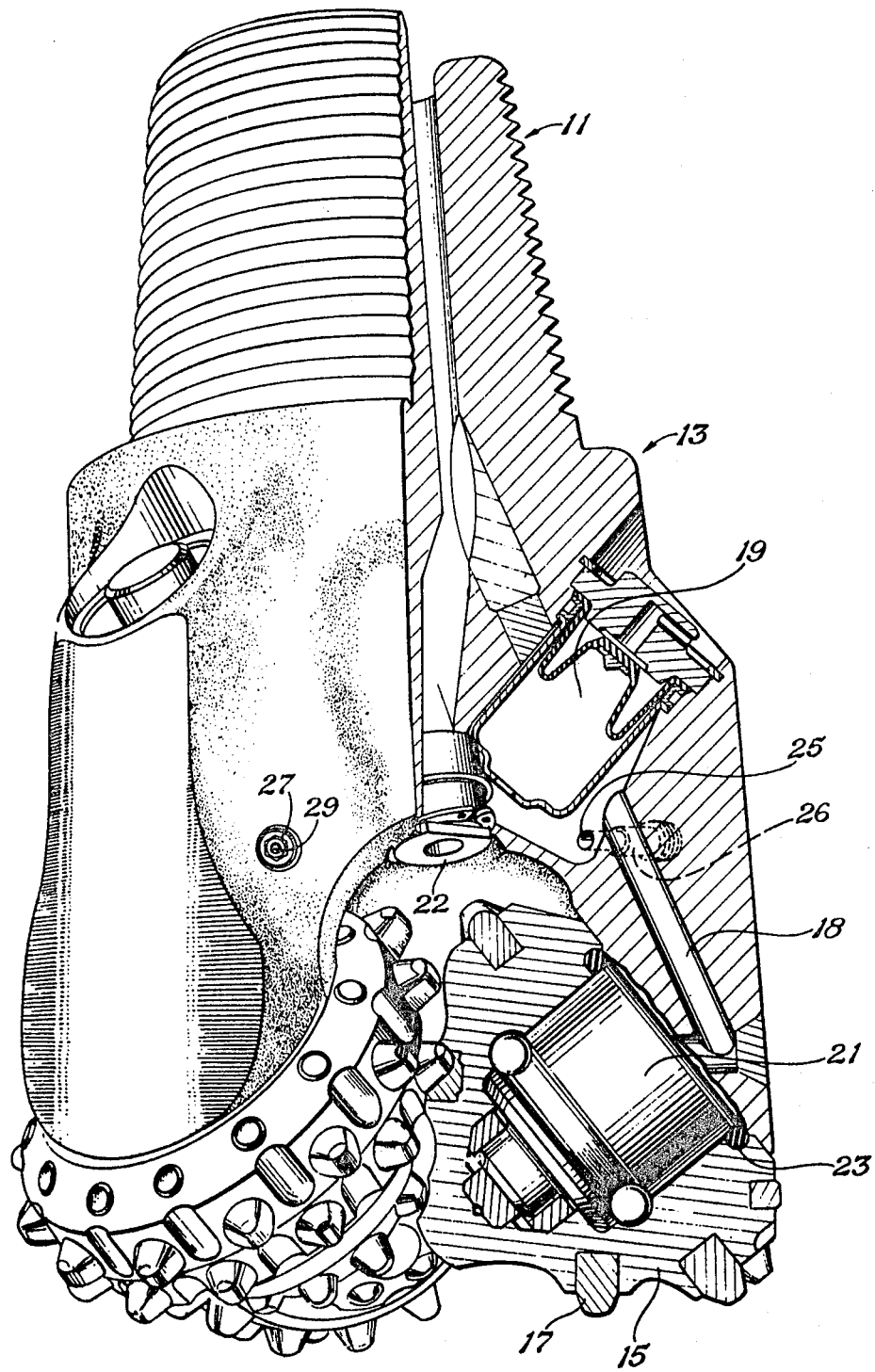
FIG. 1 is a perspective view, partially in section, of an earth boring drill bit having a lubrication system of the prior art, but which includes the improved pressure relief system of the present invention.

The numeral 11 in FIG. 1 of the drawing designates a lubricated, rotatable cutter type earth boring drill bit having a body 13 formed in three sections that each support a rotatable cutter 15 having earth disintegrating teeth 17. A prior art compensator system 19 in each section is adapted to help provide lubricant through passage 18 to the bearing means 21 between the cutter and supporting shaft, and to limit (preferably eliminate) the pressure differential across the seal 23. The bearing means 21, nozzles 22, lubrication system 19 and seal 23 may be of the previously cited prior art configurations and thus will not be described in further detail. A passage 25 communicates with the lubricant in the system and includes a recess 26 for the pressure relief means to be described hereinafter. As seen in FIG. 1, a pressure relief means is retained in position within each of the sections that supports a rotatable cutter by a threaded plug 27 having an aperture 29 to permit occasional egress of lubricant as will be apparent hereinafter.

Referring now to FIG. 2, the improved protective means or pressure relief means including a housing 31 having an axially extending opening 33. Further, the housing includes one or more radial ports 35 extending from opening 33 to an exterior annular groove 37 formed near the outer end region of the housing. A primary pressure relief valve 39 of the type described in Galle's U.S. Pat. No. 3,476,195 is confined within the opening by a retainer 41, and adapted to release lubricant and excessive fluid pressure from the lubricant system as described in said patent. In general a plunger 40 in this valve moves against a spring 42 to separate a resilient shoulder 44 from the end of a tube 46 when the pressure of the lubricant inside the lubrication system exceeds a selected value. This expels lubricant from the system, thereby lowering or relieving the fluid pressure of the lubricant in the system.

In the preferred embodiment of FIG. 2 another annular groove 43 receives an O-ring 45 and prevents the flow of fluid past the exterior cylindrical surface of the housing. The outer end region 47 of the housing is truncated as indicated by the numeral 49 in FIG. 3 to expose the end surface of an elastomeric sleeve 5 inserted within and confined in the annular, circumferential groove 37. This sleeve covers the port or ports 3 to release lubricant when a selected lubricant pressure inside the system is exceeded while simultaneous excluding the entrance of exterior matter such as drilling fluid and entrained sand particles.

An alternate embodiment is illustrated in FIGS. 4 and 6 which show housing 31 having the same configuration as the embodiments of FIGS. 2 and 3 except a circumferential groove 53 receives and confines a torus shaped elastic O-ring 55 that covers the port or ports 35 to release lubricant but exclude exterior matter.

In operation one of the embodiments described above is inserted within a relief valve recess in each passage 25 of the drill bit and retained in that position by the threaded retainer or plug 27 which has an aperture 29 to permit lubricant flow to the exterior of the bit. During drilling and when the pressure inside the lubricant system exceeds a value sufficient to actuate the primary pressure relief valve 39, the plunger 40 moves against the force of the spring 42 to separate the resilient shoulder 44 from the end of tube 46. Lubricant is therefore released within the opening 33 of the housing 31 and ultimately through the radial ports 35. When the pressure of the lubricant in the port 35 reaches a selected level, it will deform the elastic sleeve 51 in the vicinity of the ports 35 and permit lubricant to leak past the sleeve and the housing. The selected pressure level is preferably lower than the pressure required to open the primary relief valve 39. The truncated portion 49 as shown in FIG. 3 limits excessive outward deformation of the sleeve by providing an easier escape route for the lubricant. The embodiment illustrated in FIG. 4 operates in the same general manner as that described in connection with FIG. 2.

Thus, it may be seen that the invention has the advantage of excluding in an essentially fail-safe manner any foreign matter from the interior of the housing and from the primary pressure relief means, which therefore can function without failure. The invention may be used as a complete replacement for the primary pressure relief valve, since it also may function as a pressure release means to prevent the excessive build-up of pressure in the lubrication system.

While the invention has been shown in only two of its forms, it should be apparent to those skilled in the art that it is not so limited but is susceptible to various changes and modifications without departing from the spirit thereof.

I claim:

1. For use in combination with a lubricated, rotatable cutter type earth boring drill bit, an improved lubricant pressure relief valve comprising:
   a housing adapted for retention within a lubricant containing passage in the drill bit;
   said housing having an opening formed in one end to communicate with said passage and having at least one outlet port extending to the exterior of the housing and the drill bit when assembled;
   a tube secured within the housing;
   a coil spring carried within the tube;
   a plunger carried within the tube and biased by the coil spring toward said opening in the housing;
   a resilient shoulder rigidly connected to the plunger and biased by the spring against the tube;
   an elastic means carried by the housing and covering said port to release lubricant therefrom and exclude the entrance of exterior matter; said elastic means operable to release lubricant at a selected pressure lower than said spring.

2. For use in combination with a lubricated, rotatable cutter type earth boring drill bit, an improved lubricant pressure relief valve comprising:
   a generally cylindrical housing adapted for retention within a lubricant passage of said tool to expose an exterior surface;
   said housing having an axially extending opening to receive lubricant from said passage, and at least one radial port extending from the opening to the exterior of the housing and the drill bit when assembled;
   a tube secured within the housing;
   a coil spring carried within the tube;
   a plunger carried within the tube and biased by the coil spring toward said opening in the housing;
   a resilient shoulder rigidly connected to the plunger and biased by the spring against the tube;
   an annular groove formed circumferentially in the housing and being exposed to the exterior of said tool;
   an elastic sleeve disposed in said groove to cover said port to release lubricant and exclude the entrance of exterior matter; said sleeve expansionable to release lubricant at a selected pressure lower than said spring;
   an end surface of said housing that is truncated to expose a portion of one end surface of said elastic sleeve.

3. The apparatus of claim 1 wherein said elastic means is in the general shape of a torus carried by the housing in an annular groove.

4. The apparatus of claim 2 wherein the truncated end surface of said housing is in the configuration of a circular disk having a planer surface on one portion of its periphery.

* * * * *